US009606724B2

(12) United States Patent
Bellinghausen et al.

(10) Patent No.: US 9,606,724 B2
(45) Date of Patent: Mar. 28, 2017

(54) DISPLAY GRID FOR VIDEO GAME INPUT

(75) Inventors: Jeffrey J. Bellinghausen, Bellevue, WA (US); Daniel K. Paullus, Palo Alto, CA (US); Scott L. Szyjewicz, Santa Clara, CA (US); Danny G. Woodall, Kirkland, WA (US); Lup-Yen Peter Young, Dublin, CA (US)

(73) Assignee: Sixense Entertainment, Inc., Los Gatos, CA (US)

( * ) Notice: Subject to any disclaimer, the term of this patent is extended or adjusted under 35 U.S.C. 154(b) by 804 days.

(21) Appl. No.: 13/543,685

(22) Filed: Jul. 6, 2012

(65) Prior Publication Data

US 2013/0012320 A1 Jan. 10, 2013

Related U.S. Application Data

(60) Provisional application No. 61/505,066, filed on Jul. 6, 2011.

(51) Int. Cl.
| | |
|---|---|
| *A63F 9/24* | (2006.01) |
| *G06F 3/0488* | (2013.01) |
| *A63F 13/2145* | (2014.01) |
| *A63F 13/426* | (2014.01) |
| *A63F 13/40* | (2014.01) |
| *G06F 3/0354* | (2013.01) |

(52) U.S. Cl.
CPC ......... *G06F 3/04886* (2013.01); *A63F 13/10* (2013.01); *A63F 13/2145* (2014.09); *A63F 13/426* (2014.09); *G06F 3/0354* (2013.01); *A63F 2300/305* (2013.01); *A63F 2300/6045* (2013.01)

(58) Field of Classification Search
USPC .......................................... 463/42
See application file for complete search history.

(56) References Cited

U.S. PATENT DOCUMENTS

| | | | |
|---|---|---|---|
| 7,171,498 B2 * | 1/2007 | Tu .................. | G06F 3/0236 341/22 |
| 2004/0139254 A1 * | 7/2004 | Tu .................. | G06F 3/0236 710/73 |
| 2010/0041456 A1 * | 2/2010 | Yu .................. | A63F 3/00643 463/10 |
| 2011/0124410 A1 * | 5/2011 | Mao ................ | A63F 13/06 463/31 |

(Continued)

*Primary Examiner* — Masud Ahmed
(74) *Attorney, Agent, or Firm* — Gard & Kaslow LLP

(57) ABSTRACT

A method of providing input to a program, such as a video game, that expects input from a mouse and keyboard is disclosed. A plurality of large virtual cells are created on a display, each cell corresponding either to a smaller graphical button displayed by the program or to one or more keystrokes that the program will accept as input. A controller capable of moving the cursor is used to move the cursor onto a virtual cell, and a controller button pressed. An instruction is sent to the program, in the format the program expects, to perform the command corresponding to the user's action. The large virtual cells allow a user to select a command rapidly using various controllers without having to locate the cursor on the small graphical buttons of the program, and are thus well suited to large displays located at some distance from a user.

17 Claims, 7 Drawing Sheets

(56) References Cited

U.S. PATENT DOCUMENTS

2011/0246908 A1* 10/2011 Akram ............ H04N 21/234318
715/752
2012/0313857 A1* 12/2012 Senanayake ............ G06F 3/016
345/168

* cited by examiner

DISPLAY GRID FOR VIDEO GAME INPUT

This application claims priority from U.S. Provisional Patent Application No. 61/505,066, filed on Jul. 6, 2011, and entitled "MotionCreator," which is incorporated herein by reference in its entirety.

FIELD OF THE INVENTION

The present invention relates generally to computer input devices, and more particularly to controllers used with video games.

BACKGROUND OF THE INVENTION

As video games have developed, certain games have been and are designed to be played on personal computers. Since many personal computers primarily use a keyboard and mouse as input devices, many such games are similarly designed to have users activate game commands by either pressing a key on the keyboard or by using the mouse (or similar input device, such as a keypad) to position the cursor on a cell or "graphical button" that is visually represented by the game interface on a display screen of the personal computer and then "click" a mouse button or (keypad button) by depressing and releasing it to activate the selected visual button.

Such visually represented cells are generally located away from the center of the display so as not to interfere with the visual presentation of game action. For example, in a real-time strategy (RTS) game, the user may have to select from a number of choices, often 6 or more, at a particular point in game play. In such a case, one common method of display of such choices is user interface table having multiple rows and columns located in a corner of the display, each cell in the table having a graphical representation of a particular option.

Since a mouse generally provides a fast and accurate way to position the cursor, this method typically allows players to move the cursor to the table and position it over the cell representing the desired command, click the mouse button to activate the command, and then return the cursor to the field of game action quickly. Thus, this method is considered adequate for activating commands in a sufficiently fast manner to avoid disrupting game play.

However, most display monitors for personal computers are limited in size. The incorporated display in a laptop computer is generally limited to a 17 inch screen (diagonal measurement), and even a desktop computer monitor is generally in the range of 20 to 24 inches, with 30 inches being considered large. However, other video games, such as those for video game consoles (Microsoft Xbox®, Sony PlayStation®, Nintendo Wii®, etc.), are typically played on a television. In many cases the television display may be significantly larger than that of a computer; for example, many homes now have "big-screen" televisions with screens of 50 or 60 inches or more.

Thus, some players wish to take advantage of these larger screen sizes and now use televisions as display devices even when playing games that are running on their personal computers. Of course, when doing so, such players are typically positioned further away from the television display. Further, when doing so, they may no longer wish to be limited to the keyboard and mouse input devices of the personal computer, but rather to use other types of controllers that are commonly used with other game sources such as video game consoles.

For example, a keyboard and mouse must generally be placed on suitable flat surfaces relatively close to the computer, even in the case of wireless devices, and the user must remain close to the keyboard and mouse to use them. Game controllers are now often handheld and incorporate accelerometers to determine controller movement, or in some cases use external detectors with ultrasound and optical mechanisms to detect controller and/or player movement. Other known game controllers detect a local magnetic field to sense controller position with greater precision. These techniques can give the game player more freedom of movement in the environment as well as a greater range of video game input control. Many players thus now also prefer such controllers over the mouse and keyboard combination.

However, while many such game controllers have buttons which may effectively be used in the same manner as a button on a mouse, due to the lower accuracy of some game controllers and/or the greater distance between a player and the display device, it can sometimes be difficult to control movements of the cursor as easily as when using a mouse while sitting in front of a computer display. If using a motion controller, it can be difficult to hold the controller steady while pressing a button. Thus, when playing games such as RTS games which utilize tables of graphical buttons as above, it may be more difficult to manipulate the cursor to select a command from the user interface table and return it to the game field in a timely fashion, detracting from the continuity of game play.

In addition, in other games or online environments, it is sometimes necessary or desirable to enter a text string for some purpose. For example, in some cooperative games, text strings are used to communicate with other members of a gaming team, or in some instances even to activate commands for action in the game. Similarly to the use of a mouse to activate a graphical button, short text strings may typically be quickly entered on a keyboard without delaying game play.

However, game controllers typically used with game consoles do not include keyboards, and while some devices present virtual keyboards on a display such as a television screen, such virtual keyboards suffer from the same problem as the tables of available commands described above, as the cursor must be moved to each desired letter key and a button pressed. Thus, it similarly becomes difficult to enter text strings in a timely fashion with such game controllers.

Accordingly, it is desirable to have an alternative method of selecting commands quickly when using a video game console type controller with a program, such as a video game, that has an interface with graphical buttons that are normally selected with a mouse click to activate the commands, or in an environment utilizing text commands.

SUMMARY OF THE INVENTION

A method is disclosed for providing input to a program, such as a video game, that expects input from a mouse and keyboard. In one embodiment, a method is disclosed of generating instructions to a program running on a processor, the program expecting instructions in the form of either a click of a mouse button when a cursor is located on a cell displayed by the program on an output display or one or more characters from a keyboard, by using a controller having a button, the method comprising: dividing the output display into a plurality of pre-defined large virtual cells, each virtual cell corresponding to either a cell displayed by the program or a text string of one or more characters from a keyboard; receiving an indication from the controller that the controller button has been pressed; determining by the processor in which virtual cell the cursor is located when the button was pressed; if the virtual cell in which the cursor is located corresponds to a cell displayed by the program, generating an instruction to the program indicating that the cursor is located in the corresponding cell displayed by the program and that the mouse button has been clicked; and if the virtual cell in which the cursor is located corresponds to keystroke or text string, generating an instruction to the program indicating that the user has entered the corresponding keystroke or text string on the keyboard.

In another embodiment, a method is disclosed of generating instructions to a program running on a processor, the program expecting instructions in the form of either a click of a mouse button when a cursor is located on a user interface cell displayed by the program on an output touchscreen display or one or more keystrokes from a keyboard, the method comprising: dividing the touchscreen into a plurality of pre-defined virtual cells, each virtual cell corresponding to either a user interface cell or to one or more keystrokes from a keyboard, where each virtual cell corresponding to a user interface cell is larger than such corresponding user interface cell; receiving by the processor an indication that the touchscreen has been touched; determining by the processor in which virtual cell the touch of the touchscreen occurred; if the virtual cell in which the touch of the touchscreen occurred corresponds to a user interface cell, generating an instruction to the program indicating that the cursor is located in the corresponding user interface cell and that the mouse button has been clicked; and if the virtual cell in which the touch of the touchscreen occurred corresponds to one or more keystrokes, generating an instruction to the program indicating that the corresponding one or more keystrokes have been entered on the keyboard.

A further embodiment discloses a method of generating instructions to a program running on a processor and displaying output on a touchscreen, the program expecting input in the form of a touch to the touchscreen in a user interface cell displayed by the program on the touchscreen, comprising: dividing the touchscreen into a plurality of pre-defined virtual cells, each virtual cell corresponding to a user interface cell and larger than the corresponding user interface cell; receiving by the processor an indication that the touchscreen has been touched; determining by the processor in which virtual cell the touch of the touchscreen occurred; and generating an instruction to the program indicating that the touchscreen has been touched in the user interface cell corresponding to the virtual cell in which the touch occurred.

In still another embodiment, a non-transitory computer readable storage medium is disclosed, having embodied thereon instructions for causing a computing device to execute a method of generating instructions to a program running on a processor, the program expecting instructions in the form of either a click of a mouse button when a cursor is located on a cell displayed by the program on an output display or one or more characters from a keyboard, by using a controller having a button, the method comprising: dividing the output display into a plurality of pre-defined large virtual cells, each virtual cell corresponding to either a cell displayed by the program or a text string of one or more characters from a keyboard; receiving an indication from the controller that the controller button has been pressed; determining by the processor in which virtual cell the cursor is located when the button was pressed; if the virtual cell in which the cursor is located corresponds to a cell displayed by the program, generating an instruction to the program indicating that the cursor is located in the corresponding cell displayed by the program and that the mouse button has been clicked; and if the virtual cell in which the cursor is located corresponds to keystroke or text string, generating an instruction to the program indicating that the user has entered the corresponding keystroke or text string on the keyboard.

DETAILED DESCRIPTION OF THE INVENTION

Figure 1:
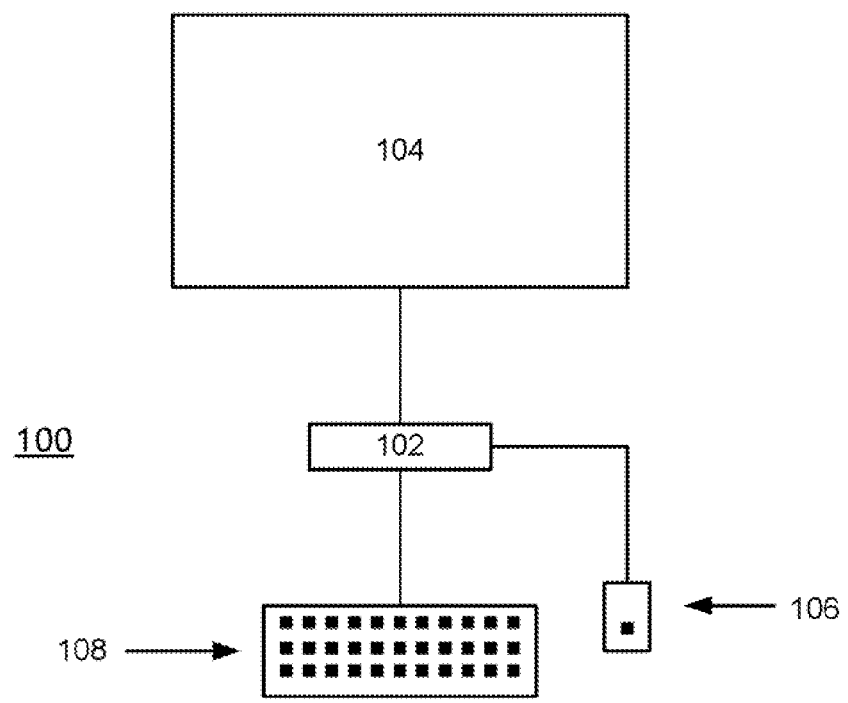
FIG. 1 is a block diagram of a prior art system for playing video games on a personal computer.

Referring now to FIG. 1, a block diagram of a prior art system 100 for playing video games on a personal computer can be seen. Here, a personal computer 102 running the video game software is coupled via a cable or other means to a display 104 for display output of the video game in operation. Display 104 is a screen incorporated into a laptop computer, or an external computer display connected to either a laptop or desktop computer. A mouse 106 and keyboard 108 are used to manipulate the cursor on the screen and to provide user commands for game play.

Figure 2:
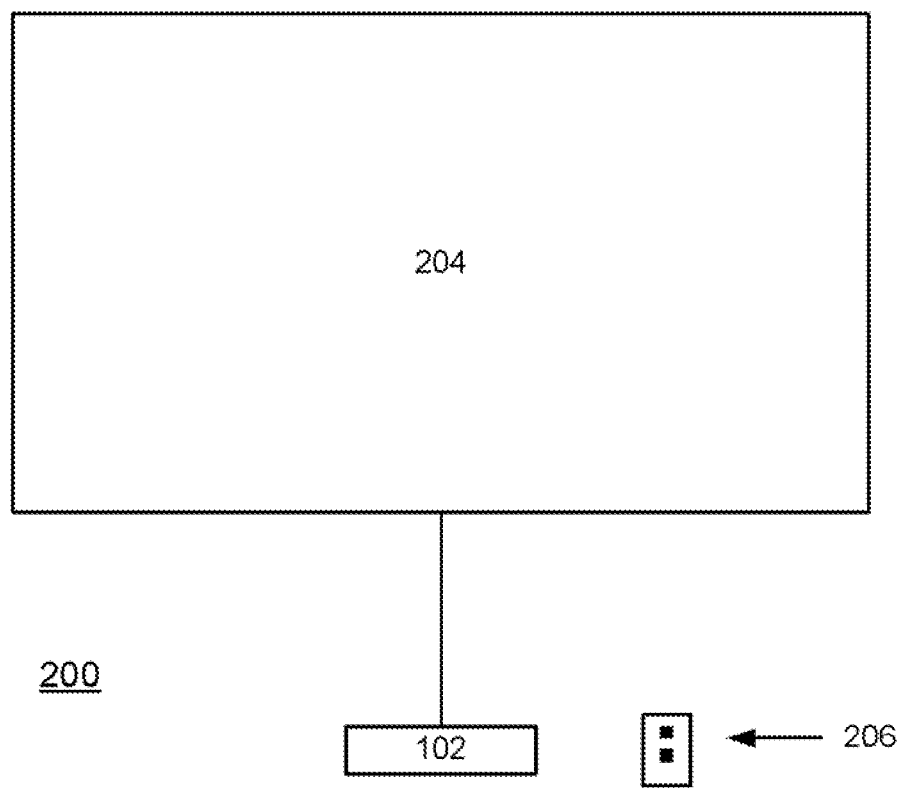
FIG. 2 is a block diagram of a prior art system for playing video games on a personal computer coupled to an external display.

FIG. 2 shows a different configuration of a system 200 in which a personal computer 102 is coupled via a cable or other means to an external display 204, such as a big-screen television. A controller 206 allows the user to manipulate the cursor and contains one or more buttons which may be pressed in appropriate circumstances as described below. Controller 206 may be one of a variety of types of input devices; in one example, controller 206 is a controller of the type that is used with a video game console, and may be wired or wireless. Controller 206 will commonly have a plurality of buttons that are used in video game play, often six or more.

Figure 3:
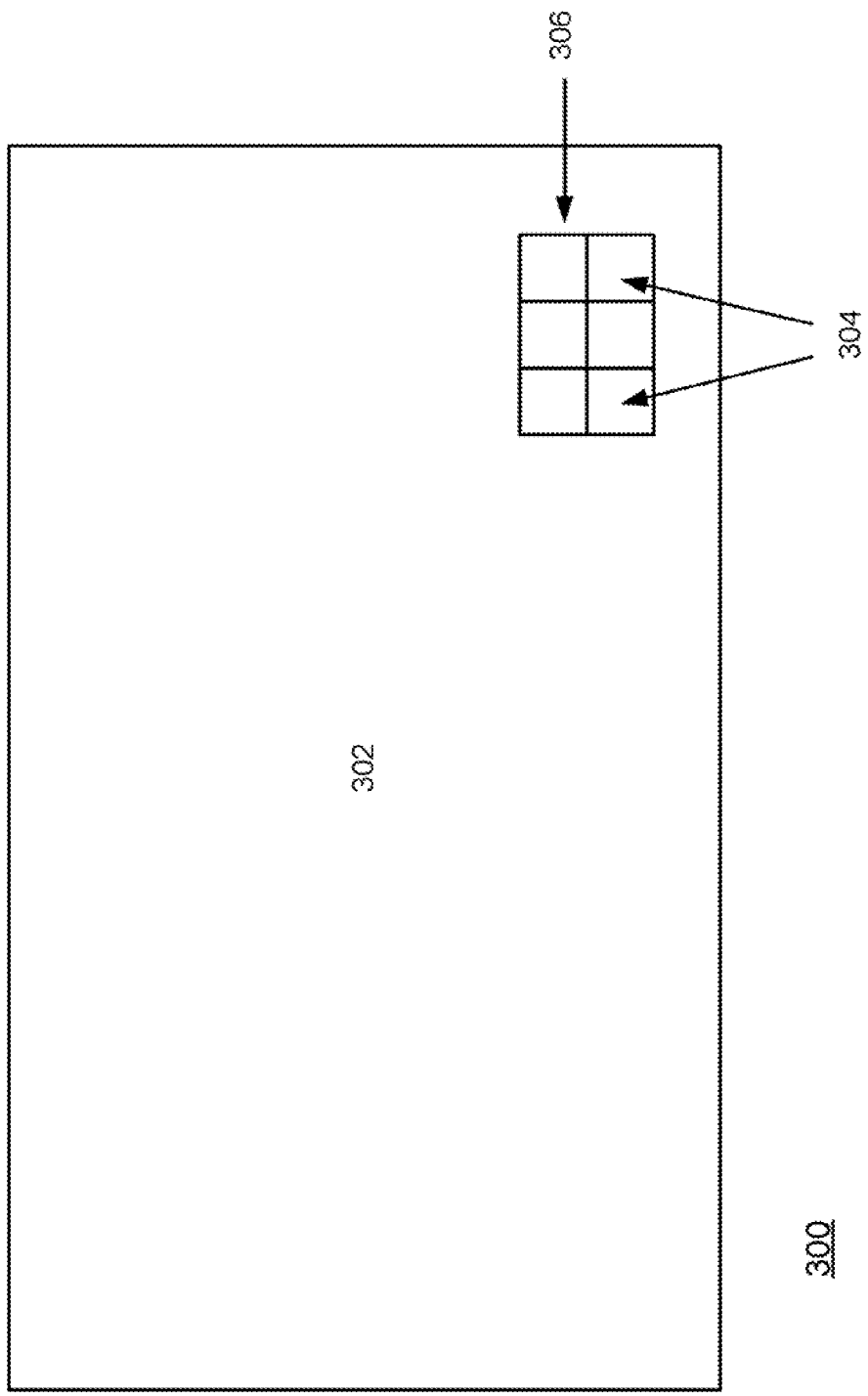
FIG. 3 is an example of a screen display such as might appear in a real-time strategy (RTS) game.

FIG. 3 shows a type of display screen 300 that is common in an RTS game. The main portion 302 of the display screen 300 typically shows the "field of play"; for example, it may show a scene or a map indicating the current location of the player's avatar within the game. Moving the mouse and "clicking" (i.e., pressing) the mouse button while the cursor is in the field of play 302 will typically cause some effect, for example, causing the player's avatar to look or move in a particular direction. (Typically a mouse will either have only one button, or, if it has more than one button, one button is considered the "main" or "dominant" button that is used for such actions, so that there is no confusion.)

There is typically also an interface that allows the player to take certain actions that are different from those that occur in the field of play 302. In some games, this may allow the player, for example, to select an object or weapon to use, a spell to cast, or a temporary enhanced ability useful in game play. This is commonly accomplished by the use of a user interface table of available options as mentioned above.

Such a user interface table 306 is shown in the lower right-hand corner of screen 300, and contains a plurality of cells 304 indicating some number of potential choices available to the player at the present point in the game. Each cell 304 in table 306 will typically contain a graphical representation of a choice available to the player. To use table 306, the player selects an action, i.e., a command to use one of the available choices, by moving the cursor over a cell 304 in table 306 that corresponds to the desired action and then "clicking" (i.e., pressing) the mouse button.

Examples of RTS games that utilize such tables include StarCraft2® from Blizzard Entertainment of Irvine, Calif., and League of Legends® from Riot Games of Santa Monica, Calif. In StarCraft2®, the game user interface includes a 5×3 table that contains available commands for creating buildings, training units of characters, and casting spells. The user interface of League of Legends® includes a 3×2 table (as illustrated in FIG. 3) of available character abilities and items that may be used.

The number of cells 304 in table 306 often represents the maximum number of choices that are available to the player at a given time. If the player is able to obtain an additional choice and the table 306 is already full, one of the previously available choices must be discarded to make room for the new choice. If the player has not yet been able to accrue the maximum number of choices, some of the cells 304 may be empty.

As above, a player using a mouse is generally able to move the cursor back and forth between field of play 302 and table 306 quickly and accurately in an RTS game with such a table interface, due to the typical smaller computer display screen size and the proximity of the player thereto. Thus, the player playing the game on a computer with a mouse is able to select appropriate actions by selecting and clicking on cells 304 from the table 306 and return the cursor to the field of play 302 without much delay to or disruption of the player's game play.

Again, however, a player may wish to play such a personal computer-based RTS game, but to use a different game controller rather than the mouse and keyboard and typically view the game on a device other than a computer display. As above, while methods are known to translate the controller movements and button activations to appear as though they came from a mouse, it is desirable to be able to activate commands as quickly as possible so as to minimize disruption of game play, particularly when using controllers having less accuracy in cursor movement.

One way of making the table interface faster and more convenient in such a situation is to effectively make a larger table, so that the precision required to place the cursor on the appropriate cell in the table is reduced. However, in doing so, it is desirable to avoid using a greater portion of the screen for the table, since doing so would reduce the portion of the screen available for the field of play and thus somewhat reduce the advantage of using the larger display.

In one embodiment, the entire screen of a large display device, such as the display 204 of FIG. 2, may be configured by software (called "translation software" herein) to be used in a fashion similar to a user interface provided by a video game. As explained further elsewhere herein, in some embodiments, the software also translates the actions on the video game controller into the format that the computer video game software expects to see from a mouse.

Figure 4:
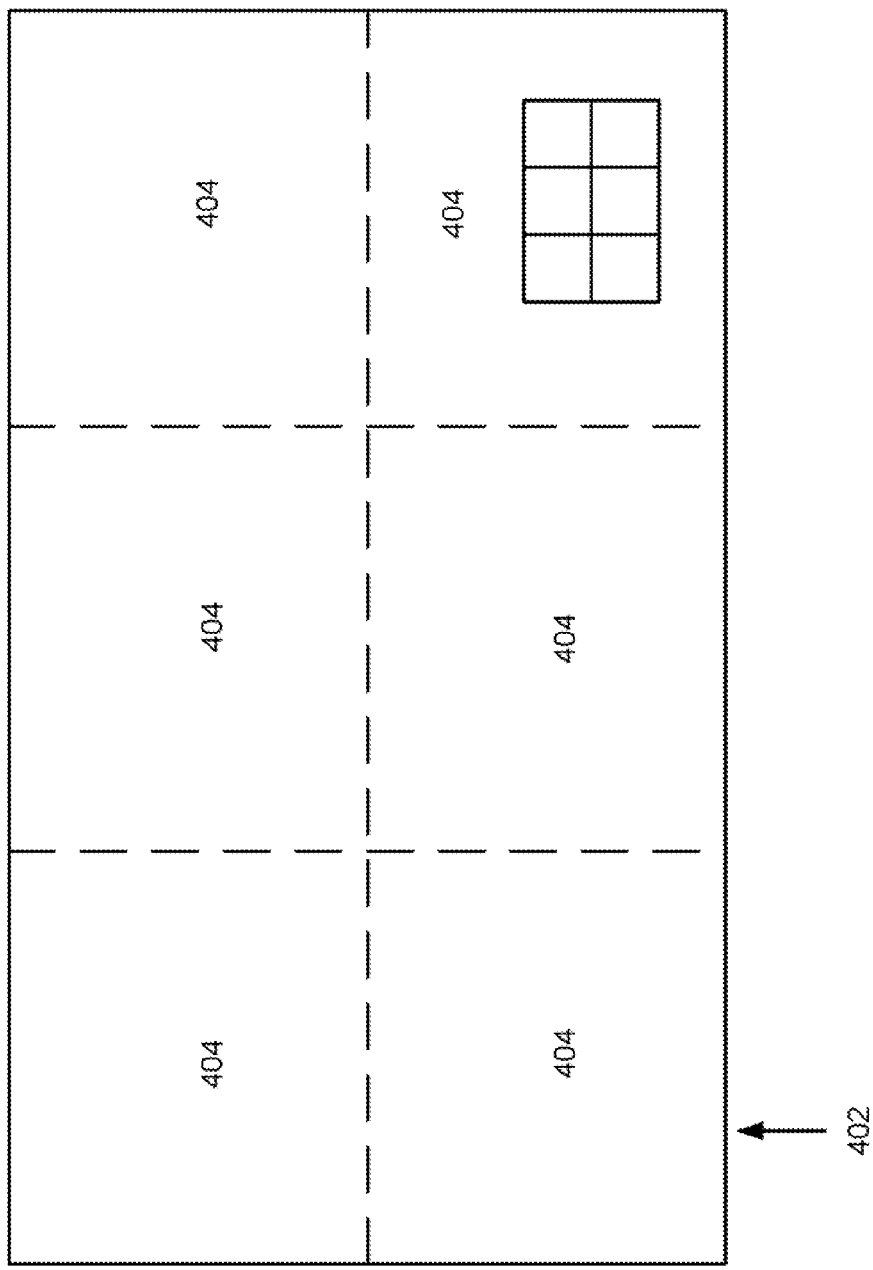
FIG. 4 is an illustration of a large display divided into a grid of cells corresponding to the table in FIG. 3 according to one embodiment.

FIG. 4 shows an embodiment in which a large display 402 is divided into a grid of cells 404 corresponding to the table 302 in FIG. 3. In one embodiment, the grid lines are not visible to the player, so as to avoid distracting the player during game play. However, in another embodiment the grid lines may be made visible if desired. The table 306 in FIG. 3 still appears, as it is part of the display generated by the video game software.

With the display divided into cells 404 in this fashion, rather than having to precisely move the cursor to one of the cells in the table, a command may be activated without the cursor leaving the field of play by moving the cursor to the corresponding cell 404 in the large grid on the display and pushing a corresponding button on the controller. Thus, even given the much larger screen size, since the cells 404 in the large grid will be significantly larger than those in the table, it will be easier and faster for a player to locate the cursor in one of the large cells 404. The grid of cells 404 is called a "click grid," since pressing the button while the cursor is located in one of the cells 404 has the same effect as clicking the mouse when the cursor is located in one of the cells 304 in the table 306.

Since the player need not move the cursor to the table 306, disruption of game play is again minimized by this procedure. There is also essentially no disruption of game play because the time used by the translation software to move the cursor from the large cell 404 to the corresponding table cell is very small, typically on the order of 20 milliseconds (msec) or less.

As above, methods of translating actions on a video game controller to appear to come from a mouse are known, and the described embodiment may be implemented in software in several ways. In one embodiment, the player will locate the cursor in one of the large cells 404 on the display and press a button on the controller; the translation software will cause the cursor to move to the corresponding cell in the game interface table, allowing the user to see the actual cell that is being selected, and send a signal to the game software indicating that the player has clicked the mouse button. Thus, the video game software perceives it as if the player is using a mouse and has located the cursor in one of the cells in the click grid and clicked the mouse button.

Typically the entire large display will be occupied by the large cells 404, so that the cells 404 are as large as possible. The translation software takes the screen resolution and divides the vertical and horizontal resolution by a desired number of rows and columns respectively (preferably the same number as in the table 306 as discussed below) to determine the desired location of the large cell grid lines.

The operating system software determines the position of the cursor. This is typically given by a two dimensional x, y coordinate system indicating where the cursor is located. The coordinate may be either in the form of two numbers indicating an actual pixel location (e.g., 867, 596), or a scaled number. For a computer running Microsoft Windows, for example, the cursor position is given a scaled screen position, running from 0,0 in one corner to 1,1 in the diagonally opposite corner. In either case, by comparing this position with the location of the large grid lines, the translation software is able to determine in which of the large cells the cursor is located at any given time.

One example of code which may implement a method of using such a 3×2 grid of FIG. 4 is shown in Appendix A. Line 1 begins a block of code defining certain conditions of the controller, and at line 2 it is indicated that this is to define which button is to be used. Line 3 indicates that player 1 is using the right controller, and line 4 indicates that button 4 on that controller is selected for use.

Line 5 begins a block of code that defines the action that occurs when the button is used, and line 6 defines the block of code creating the large click grid. At lines 7 and 8, the click grid is defined as being 3 columns by 2 rows. Next, at line 9, it is indicated that the use of the selected button (in this case button 4, set in line 4 discussed above) on the controller is to be treated as the left button on a mouse, which is the button that the video game software expects a player to use to select cells in the game user interface table.

At line 10, the bottom right corner of the screen is "pinned" to indicate where the game user interface click grid is located. The "pin" tag specifies how scaling will be performed on the positions of the cells of the game user interface table (see lines 15 through 20 below) if the resolution of the player's display differs from the output resolution of the game software. Pinning to the bottom right specifies that if the player's display resolution is greater than that of the game software, the positions will scale up and to the left. At line 11, a block of code begins that indicates how clicks or presses of the left button on the controller are to be handled.

At lines 12 and 13, the resolution of the display being used is indicated, in this case a screen having a resolution of 1920 horizontal pixels and 1080 vertical pixels. As above, the 6 large cells of the virtual click grid will occupy the entire screen. Line 14 states how the predefined positions of the center points of the game user interface cells, stated in lines 15 through 20, are affected if as above the resolution of the player's display differs from the output resolution of the game software. Here it is indicated that both the horizontal and vertical position of the listed center positions will be adjusted based upon the ratio of the vertical component of the resolution of the game software to the resolution of the player's display.

Lines 15 through 20 indicate the position on the screen where the centers of the cells in the game user interface table are located, specified by their x- and y-coordinates. This allows the translation software to move the cursor to the center of the corresponding cell in the game user interface table when the player pushes the left button on the controller in a corresponding cell in the large grid.

In typical operation, the click of a mouse button activates a command when the button is released. For this reason, the translation software may move the cursor to the game user interface table when the player locates the cursor in one of the large cells 404 and holds a button on the controller down without releasing it. However, as with a mouse button, the command corresponding to the selected cell is activated when the player releases the button. This can be useful for those players who are not as familiar with the game, as it allows them to verify which cell (i.e., command) they have chosen before they release the controller button, thereby activating the command, and can prevent them from erroneously activating a command that they do not want.

Other embodiments containing variations of this method are possible. In one alternative, when the user clicks the button with the cursor in a particular large cell 404, the translation software does not actually move the cursor to the corresponding cell in the game interface click grid, but simply uses the locations of the centers of the cells in the game user interface table to send a corresponding signal to the game software indicating that a mouse click has been executed with the cursor located at that position, even though the cursor is not actually at that location. This operates to activate the command without actually relocating the cursor as described above. Further, the cursor may be moved to the center of the large cell 404 if desired, to provide some visual confirmation to the player that the correct cell has been selected. Again, the video game software perceives the signal as a location of the cursor in a table cell and a mouse click.

The large grid will typically be programmed ahead of time to correspond to the game user interface table of a specific game, as it will be more difficult to attempt to discern a game user interface table while the game is running. Thus, it is expected that there will be a version of the translation software for each game, or a version of the translation software capable of performing the described method with a fixed and pre-programmed set of video games. However, a player may be permitted to design a customized interface, or make changes to the pre-programmed interface, if desired.

As previously stated, video game controllers typically have a number of buttons, often six or more. Thus, it is desirable to select one of the buttons on such a controller to be the button that will be interpreted as selecting one of the large grid cells 404, so that the player does not inadvertently activate a command by hitting any of the other buttons on the controller. This may also be programmed ahead of time and an instruction presented to the player that the programmed button is the one to be used for such selections; alternatively, the player may be permitted, and provided with instructions, to select which controller button he or she wishes to use for such selections, so that the player may select the button that is the most comfortable and/or easy to use.

It is believed that in most cases, it will be desirable that the large grid in a given game contain the same number of cells as the click grid in the game user interface for that game, and in the same layout, i.e., the same number of columns and rows. This will prevent the player from having to learn a different game user interface than that already present in the video game. However, this is not required, and, if a different layout is desired for some reason, the large grid need not mirror the click grid of the game user interface, or even be oriented as a grid at all.

In addition to the user game interface table used in some RTS games as described above, some RTS games also utilize keystrokes and/or character strings for various purposes. For example, in StarCraft 2®, the user may create up to 9 groups, corresponding to the number keys 1-9 on the keyboard. The user may select units, which may be, for example, soldiers or pieces of equipment such as tanks or planes, and then create a group from those units by holding the "control" (ctrl) key while pressing one of the group keys 1-9. Additional units may be added to a group by selecting the desired units and then holding the "shift" key while pressing the desired group key. In League of Legends®, it is possible to indicate emotions to other online players, specifically laughter, dancing, taunting and joking, by hitting the "enter" key to activate the "emote mode," and then entering on a keyboard the first letter of the desired emotion, i.e., d, l, t, or j.

In another example, in some games there are teams of players in an online environment, and a player may send text strings other players on the same team. Some such strings may again represent emotions ("lol" to represent laughter, "omg" to represent surprise or awe, etc.), asides ("brb" for "be right back"), or instructions ("P1R" for "player 1 go right," etc.).

Implementing these types of keystroke and text string actions can be problematic for non-keyboard controllers. As above, such controllers, again for example the type used with video game consoles, have no keyboard, and virtual keyboards suffer from the same problem as click grids in that they require a certain amount of speed in positioning of the cursor to avoid disruption of game play. To handle entry of such functions that are normally done by keyboard, in one embodiment an "action grid" is created which allows a user with such a controller to select such a function by similarly positioning the cursor on a large cell defined on the display and using a button on the controller.

Figure 5:
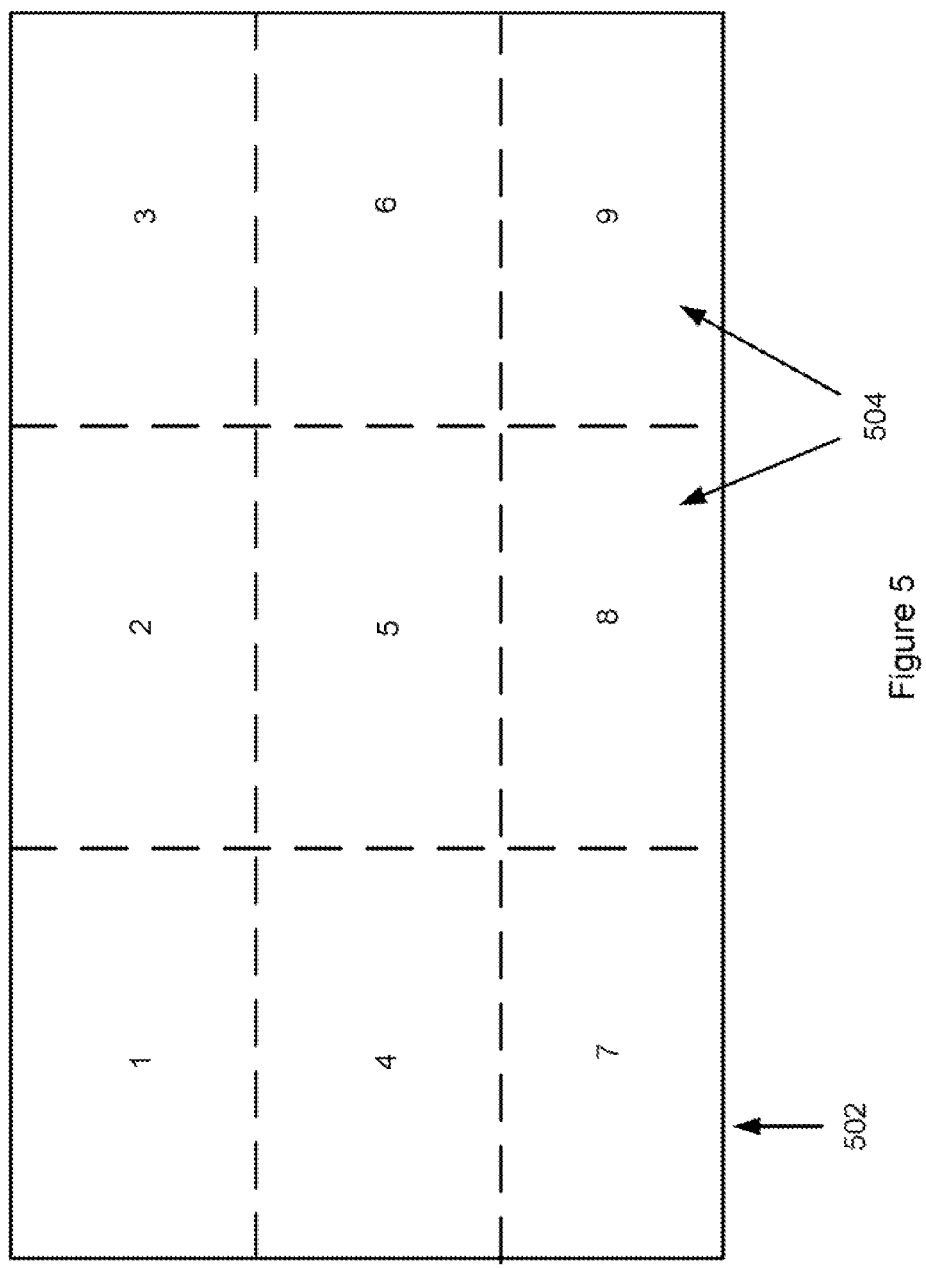
FIG. 5 is an illustration of a large display divided into a grid of cells corresponding to keyboard keys or strings according to one embodiment.

FIG. 5 shows a display 502 in which an action grid has been created having 3 rows and 3 columns, for a total of 9 cells 504, corresponding to the number keys 1-9 as they might be used in StarCraft 2® as described above. As illustrated, the cells are numbered sequentially from left to right, with 1-3 in the first row, 4-6 in the second row, and 7-9 in the third row. Again, typically the grid lines and the numbers do not appear on the display in use, but rather are shown in FIG. 5 only for purposes of illustrating how the grid is laid out on the screen.

The action grid is created in essentially the same way as a click grid would be created as described above. However, unlike a click grid, which is a counterpart to the game user interface table, the video game has no such table in the game user interface that is used to enter keystrokes or text strings. Since there is no table to emulate, the action grid may be defined in any desired way, preferably one that is easy to understand and use and thus facilitate game play. Also, when the user positions the cursor on a cell 504 and clicks a controller button and the translation software translates this action, there is no table to which to move the cursor in the game user interface as there is with a click grid. Rather, the translation software simply passes to the video game software the keystrokes or text string corresponding to the cell in which the cursor is located when the button is clicked.

Figure 6:
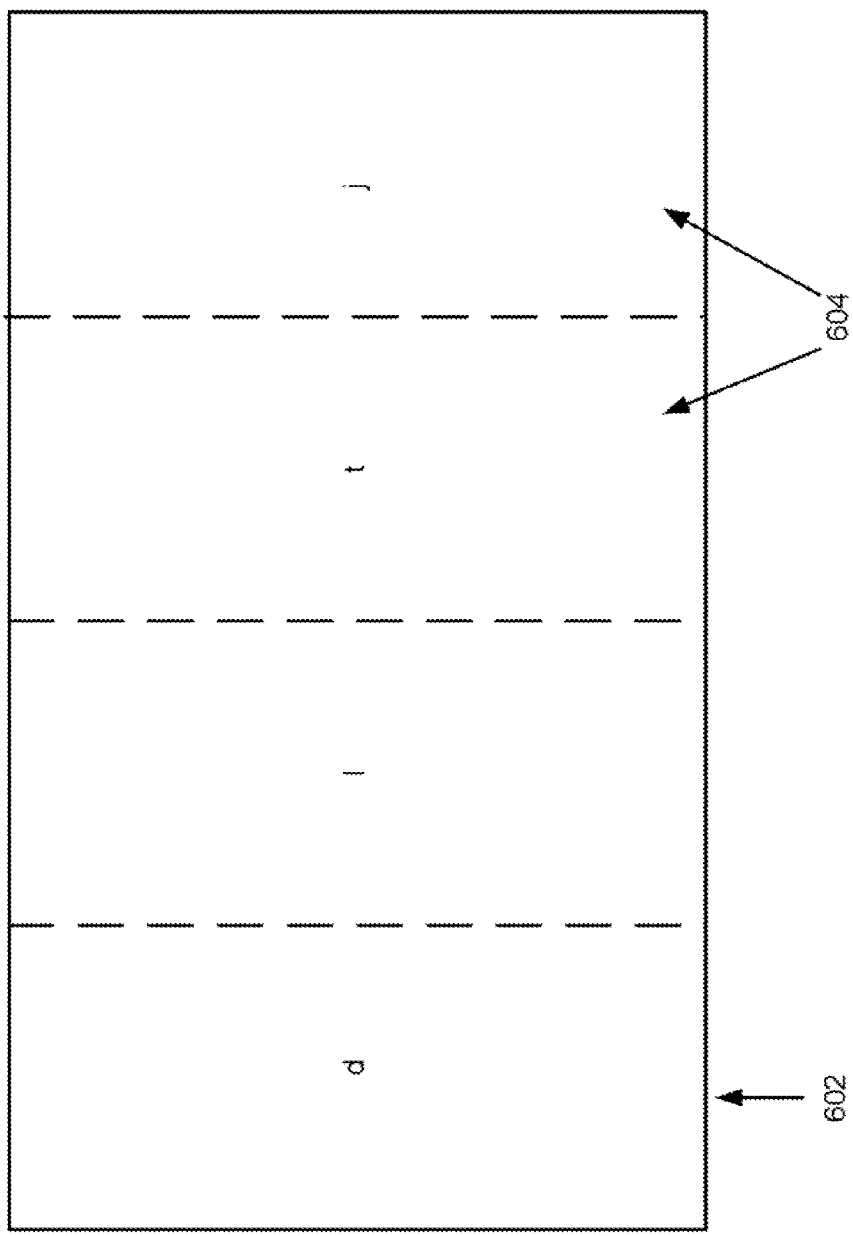
FIG. 6 is another illustration of a large display divided into a grid of cells corresponding to keyboard keys or strings according to one embodiment.

FIG. 6 shows a display 602 in which an action grid of cells 604 has been similarly created, this time having only one row and four columns, such as might be used to select the emotions in League of Legends®. The cells 604 in this action grid might correspond to the letters d, l, t, and j as above, such that clicking on the appropriate column will result in the translation software passing a signal to the video game software indicating that the corresponding key on the keyboard has been pressed. As above, typically the grid lines and letters will not appear on the display but are shown for illustration of the grid layout only.

As with the click grid interface above, and the action grid of FIG. 5, the action grid of FIG. 6 is used by moving the cursor to one of the four cells 604 and clicking a button on the controller. Again, since the game user interface has no such grid interface, the translation software translates the button click into a signal that indicates that the user has hit the "enter" key on a keyboard and then typed the letter corresponding to the cell in which the cursor is located, so that the video game software receives a signal in the expected form and can display the selected emotion.

An example of code which may implement such a 4 cell action grid of FIG. 6 is shown in Appendix B. It may be seen that as with the code of Appendix A, a controller and button are selected, here button 5. Now, however, the actions include indicating that the "enter" key has been pressed, followed by typing a letter on the keyboard indicating the emotion that the player desires to express.

Similar action grids may be designed to implement the selection of any other pre-defined keystrokes or text strings such as those described above. Again, the translation software may be pre-programmed to determine the player's desired keystroke or text input from the location of the cursor when a button is pressed, and send the video game software a signal indicating that the user has entered the desired keystrokes or text string on a keyboard.

As above, in one embodiment, the use of a button on the controller is translated and presented to the video game as a click of the button on a mouse with the cursor on a click grid in the game user interface. In another embodiment, the use of a button on the controller selects commands that are equivalent to character strings from an action grid. Again, where the controller has more than one button, as many, if not most, video game console style controllers do, in either of these embodiments, any button on the controller may be chosen as the button that is to be recognized as the button that selects a large grid cell, either by preprogramming the translation software to recognize a particular button or by letting the player choose which button should be so recognized.

However, the availability of multiple buttons on a video game controller leads to another possible embodiment. It is possible to use multiple large grids of the types described above simultaneously, each activated by a different button on the controller. Thus, a player playing League of Legends® might have both the click grid and action grid described above available at the same time, although the player will most likely access only one or the other at a given point in time; the player may use the large grid shown in FIG. 4 by using one button to select a large cell to activate a character ability or an item to be used as described above, and the large action grid shown in FIG. 6 by using another button to select a different large cell to indicate emotions to other players as also described above. For this reason, since both the click grid of FIG. 4 and Appendix A and the action grid of FIG. 6 and Appendix B may be used with League of Legends®, the code of Appendix A indicates that button 4 on the controller is used for the click grid while Appendix B uses button 5 for the action grid.

As above, the large grids will typically be pre-programmed in the translation software. The buttons to be used to activate each grid may similarly be pre-programmed as part of the translation software in one embodiment, or may allow the buttons which activate each grid to be chosen by the player in another embodiment. In either case, when the player pushes a button corresponding to a grid, the translation software will receive a signal indicating the button pushed by the player and the location of the cursor, and will translate that into a signal recognizable by the video game software, i.e., indicating either that the player has located the cursor on a cell in the game user interface click grid and pushed a mouse button, or that the player has pushed the "enter" key and typed a letter to indicate an emotion as described above.

Any combination of grids may be used in this manner. Thus, for example, there may be two or more click grids that are each activated by a different button on the controller, and which each contain different selections that result in commands to the video game if such an interface is desired or appropriate. The grids need not have the same number of cells, or the same layout.

In yet another alternative, there may be two or more action grids that are each activated by a different button on the controller, each grid containing cells that correspond to a number of possible key strokes or text strings that are sent to the video game when the appropriate cells are activated by the controller button. Again, the grids need not have the same number of cells or layout, or even result in the same actions, i.e., one grid may represent single key strokes and another grid may represent text strings.

Figure 7:
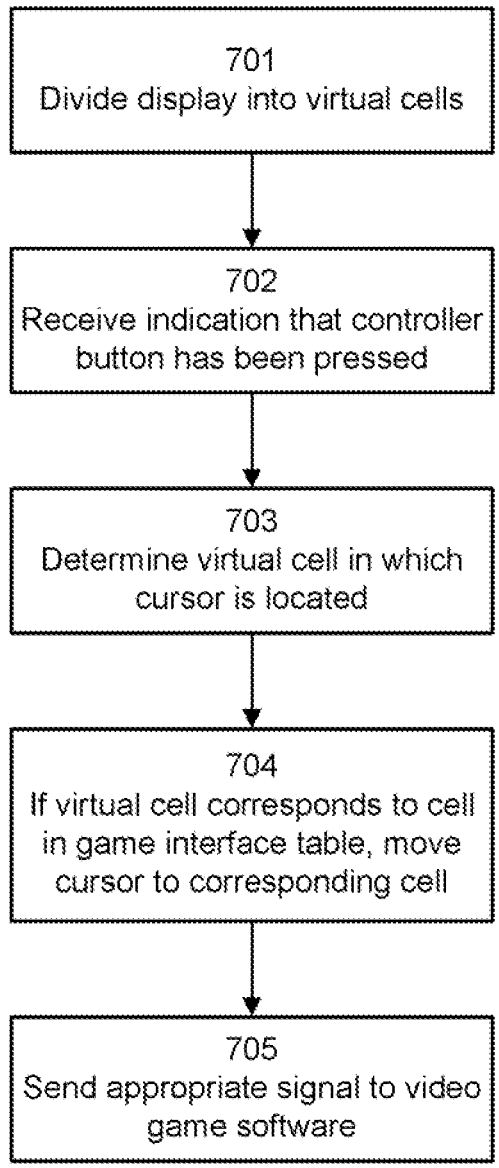
FIG. 7 is a flowchart illustrating one possible embodiment of a method as described herein embodied in software.

FIG. 7 is a flow chart of the steps of one embodiment of the described method. A video game controller to be used has been pre-selected, and a button on the controller selected as the button that will be recognized as sending a signal equivalent to that of a mouse. At step 701, the screen of the display device is divided a plurality of large virtual cells that have been pre-defined. As above, these may not be visible to the player, and may form a click grid that is a larger version of the game user interface table, or may be in some other arrangement, or may include cells that correspond to keystrokes or text strings.

At step 702, an indication is received that the button on the controller has been pressed by the player, and at step 703 it is determined in which of the large virtual cells the cursor was located when the button was pressed.

At step 704, if the large virtual cell corresponds to a cell in the game user interface table displayed by the video game software, the cursor is moved to that corresponding cell. An appropriate signal representing the player's action is then sent to the video game software at step 705. As above, if the large virtual cell corresponds to a cell in the game user interface table, the signal sent indicates that the player has moved the cursor to that cell in the table and pressed the mouse button. If, on the other hand, the large virtual cell corresponds to one or more keystrokes or a text string, the signal sent indicates that the user has entered such keystroke(s) or text string on a keyboard.

It should be noted that the video game controller and translation software may provide significant additional functionality beyond that described above, for example, translating gestures with a game controller for which position and/or orientation data can be detected as above into input data in a format expected by the software application, such as instructions that appear to have come from a keyboard, mouse, joystick, steering wheel, or almost any other input device. Thus, in a video game in which a player might initiate a jump by a character in the game by pressing the spacebar on a keyboard, using a game controller the player might tilt the controller up, and have translation software interpret this motion as a desire to cause a jump and send a signal to the video game software indicating that the keyboard spacebar has been pressed. The game controller may map a large variety of input device commands used with software applications, such as video games, and bind the controller conditions, such as buttons, triggers, directional pads or joysticks, and gestures to those input device commands through XML (Extensible Markup Language) code, allowing for a large number of possible control configurations and custom layouts.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

For example, other video games than those expressly mentioned, and even some programs other than video games, may be able to use the methods described herein to simplify use with input devices other than a mouse and keyboard. An operating system may provide on a display a user interface containing icons or cells, to which larger virtual cells may correspond as described herein. In some cases, even the use of a mouse may be enhanced by the described methods. In addition to controllers used with video game consoles, other input devices may be used to indicate a screen location and create an event that may be recognized as equivalent to a mouse click, including, for example, a trackball, touchpad, joystick, television remote control or other infrared controller, etc. A touchscreen display may also be used as such an input device, and a touch to a virtual cell translated in a similar fashion to the way the pressing of a button with the cursor located in the virtual cell would be translated as described above.

In some embodiments, a camera or other device sensing motion of a user may be used, such that the user may be able to physically point to a virtual cell on the display. In such cases, there may not be a button to press, and some other means of indicating a selection may be used, for example speech or clapping.

In other embodiments, the methods described herein may be used with a device that uses a touchscreen both for input and output, and may not have a cursor displayed on the screen, such as an iPad® from Apple, Inc. of Cupertino, Calif. In many uses of an iPad®, functions or applications are activated by touching an icon or cell displayed on the screen by a program or the operating system. In such cases, it is still possible to use the virtual grid and cells described herein, with each virtual cell corresponding to, and larger than, the icon or displayed cell. A user indicates a selection by touching the screen within the boundaries of a virtual cell, and translation software sends an instruction to the program or the operating system as appropriate indicating that the user has touched the corresponding icon or displayed cell.

It is also to be understood that program functions other than those specifically discussed herein may be conducive to the use of the techniques described herein.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc. The methods may also be incorporated into hard-wired logic if desired. It should be noted that the order of the steps of the methods described herein may be altered and still be within the scope of the disclosure.

These and other variations upon the embodiments are intended to be covered by the present disclosure, which is limited only by the appended claims.

APPENDIX A

```
<!-- 6 Slot Inventory Grid (3x2) -->
        <binding>
(1)         <conditions>
(2)             <button>
(3)                 <controller>P1R</controller>
(4)                 <which>4</which>
                </button>
            </conditions>
(5)         <actions>
(6)             <click_grid>
(7)                 <num_cols>3</num_cols>
(8)                 <num_rows>2</num_rows>
(9)                 <mouse_button>left</mouse_button>
(10)                <pin>bottom_right</pin>
(11)                <click_pos_list>
```

APPENDIX A-continued

```
(12)            <horizontal_resolution>1920
                </horizontal_resolution>
(13)            <vertical_resolution>1080
                </vertical_resolution>
(14)            <change_aspect_mode>scale_by_vertical
                </change_aspect_mode>
(15)            <pos>0.140 0.118</pos>
(16)            <pos>0.161 0.118</pos>
(17)            <pos>0.183 0.118</pos>
(18)            <pos>0.140 0.077</pos>
(19)            <pos>0.161 0.077</pos>
(20)            <pos>0.183 0.077</pos>
            </click_pos_list>
        </click_grid>
    <actions>
<binding>
```

APPENDIX B

```
<binding>
    <name>Emote Grid</name>
        <conditions>
            <button>
                <controller>P1R</controller>
                <which>5</which>
            </button>
        </conditions>
        <actions>
            <key>
                <which>enter</which>
            </key>
            <action_grid>
                <num_cols>4</num_cols>
                <num_rows>1</num_rows>
                <action_list>
                    <type_string>d</type_string>
                    <type_string>l</type_string>
                    <type_string>t</type_string>
<type_string>j</type_string>
                </action_list>
            </action_grid>
        </actions>
</binding>
```

What is claimed is:

1. A method of generating instructions to a program running on a processor, the program expecting an instruction in the form of a click of a mouse button when a cursor is located on one of a plurality of user interface cells displayed by the program on an output display, the method comprising:
dividing the output display into a plurality of pre-defined virtual cells in a same number and layout as the user interface cells, each virtual cell having a position in the layout of virtual cells corresponding to one of the user interface cells in a same position in the layout of the user interface cells where each virtual cell corresponding to a user interface cell is larger than such corresponding user interface cell;
receiving an indication a user selected action has occurred;
determining by the processor in which virtual cell the user selected action has occurred;
generating an instruction to the program indicating that the cursor is located in the corresponding user interface cell and that the mouse button has been clicked.

2. The method of claim 1 in which the method is performed by using a controller having a button, and wherein:
receiving an indication that a user selected action has occurred further comprises receiving an indication that the controller button has been pressed; and
determining in which virtual cell the user selected action has occurred further comprises determining in which virtual cell a cursor was located when the controller button was pressed.

3. The method of claim 2 wherein the cells displayed by the program comprise a table having a plurality of columns and rows, and the plurality of virtual cells comprises a grid containing the same number of columns and rows as the table displayed by the program.

4. The method of claim 2 wherein the program is a video game.

5. The method of claim 2 wherein the controller is a video game controller.

6. The method of claim 2 wherein the controller is a mouse.

7. The method of claim 2 further comprising, if the virtual cell in which the cursor is located corresponds to a cell displayed by the program, moving the cursor from the virtual cell to the corresponding cell displayed by the program.

8. A non-transitory computer readable storage medium having embodied thereon instructions for causing a computing device to execute a method of generating instructions to a program running on a processor, the program expecting instructions in the form of a click of a mouse button when a cursor is located on a one of a plurality of user interface cells displayed by the program on an output display, by using a controller having a button for generating an action, the method comprising:
dividing the output display into a plurality of pre-defined virtual cells in a same number and layout as the user interface cells, each virtual cell having a position in the layout of virtual cells corresponding to one of the user interface cells in a same position in the layout of the user interface cells displayed by the program, where each virtual cell corresponding to a user interface cell is larger than such corresponding user interface cell;
receiving an indication from the controller that an action has occurred;
determining by the processor in which virtual cell the action has occurred;
generating an instruction to the program indicating that the cursor is located in the corresponding user interface cell and that the mouse button has been clicked.

9. The method of claim 2 wherein the plurality of virtual cells on the display comprises a grid.

10. A method of generating instructions to a program running on a processor, the program expecting instructions in the form of a click of a mouse button when a cursor is located on one of a plurality of user interface cells displayed by the program on an output display, the method comprising:
dividing the output display into a plurality of pre-defined virtual cells of a same number and layout as the user interface cells, each of the virtual cells having a position in the layout of virtual cells corresponding to a different one of the plurality of user interface cells in a same position in the layout of the user interface cells, where each virtual cell is larger than such corresponding user interface cell;
receiving an indication a user selected action has occurred;
determining by the processor in which virtual cell the user selected action has occurred; and
generating an instruction to the program indicating that the cursor is located in the user interface cell corresponding to the determined virtual cell and that the mouse button has been clicked.

11. The method of claim 10 in which the method is performed by using a controller having a button, and wherein:
- receiving an indication that a user selected action has occurred further comprises receiving an indication that the controller button has been pressed; and
- determining in which virtual cell the user selected action has occurred further comprises determining in which virtual cell a cursor was located when the controller button was pressed.

12. The method of claim 11 wherein the plurality of virtual cells on the display comprises a grid.

13. The method of claim 11 wherein the cells displayed by the program comprise a table having a plurality of columns and rows, and the plurality of virtual cells comprises a grid containing the same number of columns and rows as the table displayed by the program.

14. The method of claim 11 wherein the program is a video game.

15. The method of claim 11 wherein the controller is a video game controller.

16. The method of claim 11 wherein the controller is a mouse.

17. The method of claim 11 further comprising, if the virtual cell in which the cursor is located corresponds to a cell displayed by the program, moving the cursor from the virtual cell to the corresponding cell displayed by the program.

\* \* \* \* \*